(12) United States Patent
Takahashi et al.

(10) Patent No.: US 8,767,413 B2
(45) Date of Patent: Jul. 1, 2014

(54) INTEGRATED SWITCHING POWER SUPPLY DEVICE AND ELECTRIC APPARATUS

(75) Inventors: Yuji Takahashi, Kanagawa-ken (JP); Noriyuki Kitamura, Kanagawa-ken (JP)

(73) Assignee: Toshiba Lighting & Technology Corporation, Kanagawa (JP)

( * ) Notice: Subject to any disclaimer, the term of this patent is extended or adjusted under 35 U.S.C. 154(b) by 141 days.

(21) Appl. No.: 13/565,680

(22) Filed: Aug. 2, 2012

(65) Prior Publication Data

US 2013/0083561 A1    Apr. 4, 2013

(30) Foreign Application Priority Data

Sep. 29, 2011    (JP) .................................. 2011-215519

(51) Int. Cl.
*H02M 3/335* (2006.01)
*H02M 3/338* (2006.01)

(52) U.S. Cl.
USPC .................. 363/16; 363/37; 363/67

(58) Field of Classification Search
USPC ............. 363/16, 20, 21.09, 22.17, 22–25, 37, 363/39–41, 49, 52–53, 55, 56.04–56.02, 363/65–70, 73–76, 78–82, 95–98, 123–127, 363/130–134, 140, 147, 165
See application file for complete search history.

(56) References Cited

U.S. PATENT DOCUMENTS

| 5,302,889 | A  | * | 4/1994 | Marsh ............................ 323/284 |
| 7,019,474 | B2 | * | 3/2006 | Rice et al. ................. 318/400.26 |
| 7,545,657 | B2 | * | 6/2009 | Shimada et al. ................. 363/49 |
| 7,576,525 | B2 | * | 8/2009 | So et al. ......................... 323/276 |
| 7,894,223 | B2 | * | 2/2011 | Sato et al. ......................... 363/97 |
| 7,924,581 | B2 | * | 4/2011 | Hsu .................................. 363/49 |
| 2010/0259956 | A1 | * | 10/2010 | Sadwick et al. ................ 363/50 |
| 2013/0069613 | A1 | * | 3/2013 | Nakase et al. ................. 323/284 |

FOREIGN PATENT DOCUMENTS

JP    2011-119237    6/2011

* cited by examiner

*Primary Examiner* — Adolf Berhane
*Assistant Examiner* — Nusrat Quddus
(74) *Attorney, Agent, or Firm* — Patteson + Sheridan, LLP

(57) ABSTRACT

An integrated switching power supply device includes a series-connected body, a driving control element, and external terminals. In the series-connected body, a switching element, a constant current element, and a diode are connected in series. The driving control element controls to drive the constant current element. The external terminals include first to seventh external terminals. The first and second external terminals are connected to main terminals of elements of the series-connected body. The third external terminal is connected to a connection point of main terminals of the switching element or the constant current element and a main terminal of the diode. The fourth external terminal is connected to a control terminal of the switching element. The fifth external terminal supplies electric power to the driving control element. The sixth external terminal inputs reference potential. The seventh external terminal inputs a signal to the driving control element.

20 Claims, 3 Drawing Sheets

INTEGRATED SWITCHING POWER SUPPLY DEVICE AND ELECTRIC APPARATUS

CROSS-REFERENCE TO RELATED APPLICATIONS

This application is based upon and claims the benefit of priority from the prior Japanese Patent Application No. 2011-215519, filed on Sep. 29, 2011; the entire contents of which are incorporated herein by reference.

FIELD

Embodiments described herein relate generally to an integrated switching power supply and an electric apparatus.

BACKGROUND

An LED lighting circuit and a luminaire including the LED lighting circuit include an output generating section including at least one switching element of a normally-on type and configured to generate a direct-current output by turning on and off the switching element, a semiconductor light-emitting element lit by the direct-current output generated by the output generating section, and a driving control section configured to turn on and off the switching element using an electric current flowing through the semiconductor light-emitting element. The switching element and a constant current element and a diode of the output generating section can be connected in series and integrated.

BRIEF DESCRIPTION OF THE DRAWINGS

FIGS. 2A and 2B are diagrams of a form of the integrated switching power supply device, wherein FIG. 2A is a schematic top view and FIG. 2B is an A-A' line sectional view of FIG. 2A;

DETAILED DESCRIPTION

First Embodiment

Figure 1:
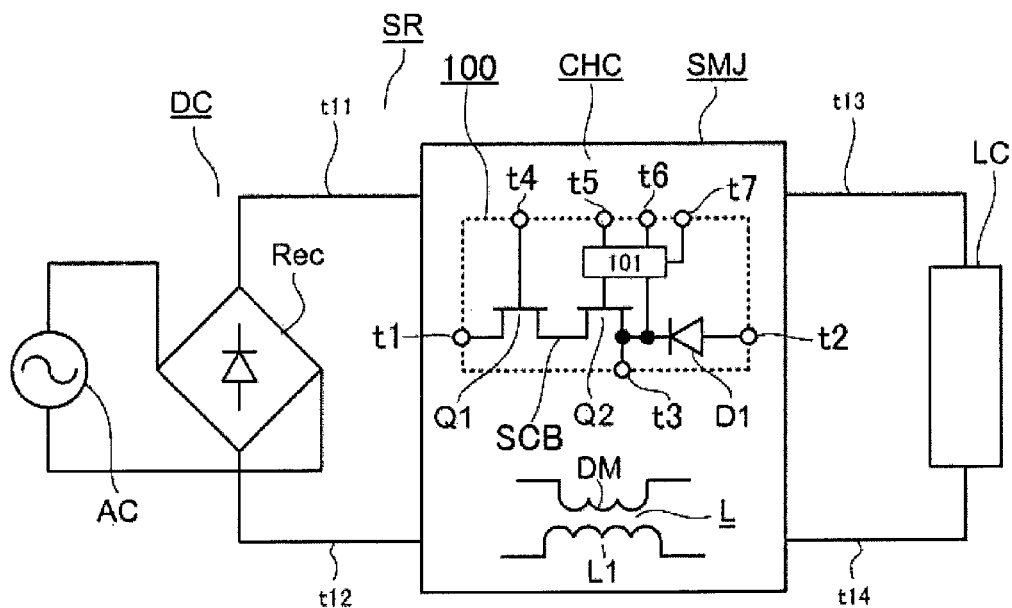
FIG. 1 is a circuit diagram of an integrated switching power supply device and an electric apparatus according to a first embodiment.

A first embodiment is directed to an integrated switching power supply device including a series-connected body, a driving control element, and a plurality of external terminals. In the series-connected body, a switching element, a constant current element, and a diode are connected in series. The driving control element is connected to a control terminal of the constant current element and configured to control to drive the constant current element. The plurality of external terminals include first to seventh external terminals. The first external terminal is connected to a main terminal of an element located on one end side of the series-connected body. The second external terminal is connected to a main terminal of an element located on one other end side of the series-connected body. The third external terminal is connected to a connection point of a main terminal of the switching element or the constant current element and a main terminal of the diode. The fourth external terminal is connected to a control terminal of the switching element. The fifth external terminal is connected to the driving control element and connected to a power supply source for the driving control element. The sixth external terminal is connected to the driving control element and configured to input reference potential to the driving control element. The seventh external terminal is connected to the driving control element and configured to input a signal to the driving control element from the outside.

Second Embodiment

A second embodiment is directed to an integrated switching power supply device according to the first embodiment, wherein the constant current element and the driving control element are integrated and formed as a module.

Third Embodiment

A third embodiment is directed to an integrated switching power supply device according to the first embodiment, wherein the switching element and the diode are integrated.

Fourth Embodiment

A fourth embodiment is directed to an integrated switching power supply device according to the first embodiment, wherein the third external terminal and the sixth external terminal are used in common.

Fifth Embodiment

A fifth embodiment is directed to an electric apparatus includes the integrated switching power supply device according to any one of the first to fourth embodiment and a load circuit. The load circuit is connected to the integrated switching power supply device.

Integrated switching power supply devices and electric apparatuses according to embodiments are explained below with reference to the accompanying drawings. The drawings are schematic or conceptual. Relations between shapes and widths of sections, ratios of the sizes of the sections, and the like are not always the same as real ones. The same sections are sometimes shown at different dimensions and ratios depending on the drawings. Further, in this specification and the drawings, components same as those already explained with reference to the drawings are denoted by the same reference numerals and signs and detailed explanation of the components is omitted.

First Embodiment

Figure 2A:
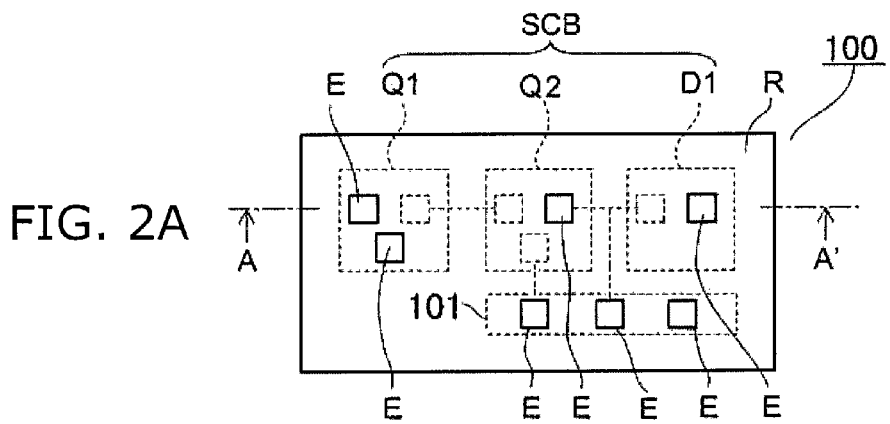
Figure 2B:
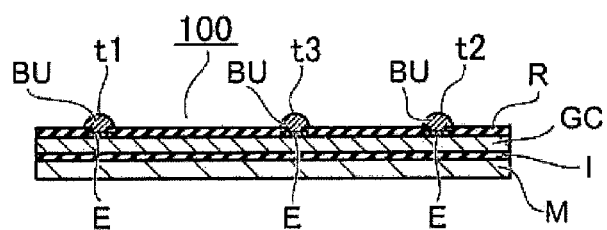
Figure 3:
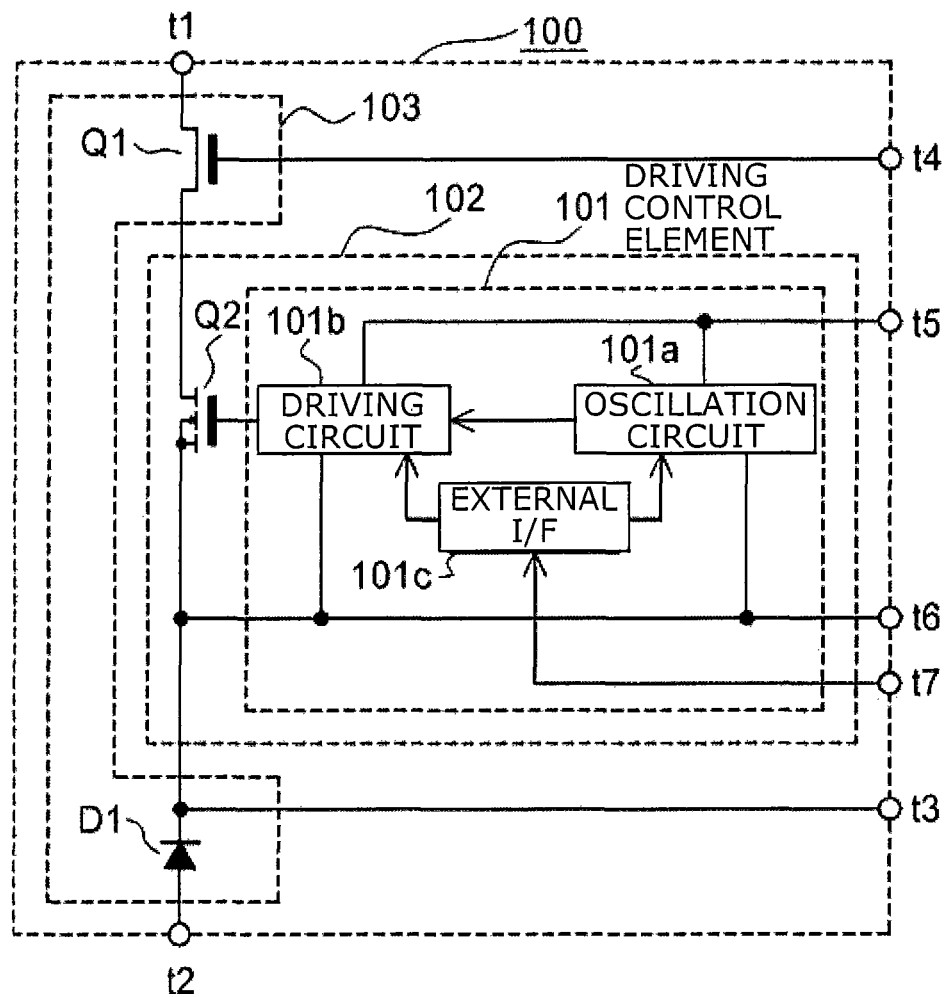
FIG. 3 is a circuit diagram of the integrated switching power supply device.

A first embodiment is explained. FIG. 1 is a circuit diagram of an electric apparatus including an integrated switching power supply device according to the first embodiment. FIGS. 2A and 2B are diagrams of a form of the integrated switching power supply device, wherein FIG. 2A is a schematic top view and FIG. 2B is an A-A' line sectional view of FIG. 2A. FIG. 3 is a circuit diagram of the integrated switching power supply device according to the first embodiment.

An integrated switching power supply device 100 according to the first embodiment includes, as shown in FIG. 1 and FIGS. 2A and 2B, a series-connected body SCB integrated by connecting a switching element Q1, a constant current element Q2, and a diode D1 in series. The integrated switching power supply device 100 includes a driving control element 101 connected to a control terminal (a gate) of the constant current element Q2 and configured to control to drive the constant current element Q2.

The integrated switching power supply device 100 includes plural external terminals including first to seventh external terminals t1 to t7. The first external terminal t1 is connected to a main terminal of an element located on one end side of the series-connected body SCB. The second external terminal t2 is connected to a main terminal of an element located on the other end side of the series-connected body SCB. The third external terminal t3 is connected to a connection point of a main terminal of the switching element Q1 or the constant current element Q2 and a main terminal of the diode D1. The fourth external terminal t4 is connected to a control terminal (a gate) of the switching element Q1. The fifth external terminal t5 is connected to the driving control element 101 and configured to supply electric power to the driving control element 101. The sixth external terminal t6 is connected to the driving control element 101 and configured to input reference potential to the driving control element 101. The seventh external terminal t7 is connected to the driving control element 101 and configured to input a signal to the driving control element 101 from the outside.

The integrated switching power supply device 100 can be combined with external circuit components, which include a first inductor L1 as a main circuit component, to configure a switching power supply SR. The integrated switching power supply device 100 receives the input of direct-current electric power from a direct-current power supply DC to operate and urges a load circuit LC with the direct-current electric power of the output.

In this embodiment, the switching element Q1 performs switching of the switching power supply SR. The switching element Q1 may be either a switching element having a normally-on characteristic, i.e., a normally-on switch or a switching element having a normally-off characteristic, i.e., a normally-off switch.

In the case of a switching element including a wide bandgap semiconductor, the switching element having the normally-on characteristic is more easily obtained. The switching element has high switching speed and low ON resistance. Although the normally-off switch is easily handled because the normally-off switch is off during power-on, if the normally-off switch is caused to operate by self-oscillation, a start-up circuit for starting up the oscillation is necessary. However, since a simple start-up circuit only has to be added, there is no basic problem. If the switching element Q1 is the normally-on switch, since the start-up circuit does not have to be added during power-on, a circuit of the switching element can be simplified. This contributes to a reduction in the sizes of the integrated switching power supply device 100 and the switching power supply SR including the integrated switching power supply device 100. An OFF operation in the case of the normally-on switch is desirably performed by the constant current element Q2.

If the switching element including the wide bandgap semiconductor, for example, a GaN-HEMT is used as the switching element Q1, a switching characteristic at a high frequency is extremely improved. Therefore, the switching element is suitable as the switching element Q1 in this embodiment that operates at a frequency equal to or higher than megahertz order, preferably, equal to or higher than 10 MHz. When the operating frequency of the switching power supply SR is high as explained above, since first and second inductors L1 and DW are also reduced in size, a substantial reduction in the size of the switching power supply SR can be realized. The wide bandgap semiconductor may be any semiconductor such as silicon carbide (SiC), gallium nitride (GaN), or diamond as long as the semiconductor has a wide bandgap in a semiconductor substrate.

In this embodiment, the constant current element Q2 is an element having a constant current characteristic. When a current value exceeds a predetermined constant current value, the constant current element Q2 turns off the switching element Q1. The constant current element Q2 is an element that can be caused to operate in a frequency domain equal to or higher than megahertz order, preferably, a frequency domain equal to or higher than 10 MHz. For example, a junction FET can be used as the constant current element Q2. A GaN-HEMT, which is a type of the junction FET, is suitably used as the constant current element Q2. In this case, a constant current value can be changed by changing a gate voltage. Because of the rapidity of the GaN-HEMT, after a current value reaches the constant current value, a drain-to-source voltage of the constant current element Q2 quickly rises to turn off the switching element Q1. If the constant current value is fixed, a constant current diode can also be used as the constant current element Q2.

In order to turn off the switching element Q1, the constant current element Q2 configures a circuit such that the constant current element Q2 is interposed in series to the switching element Q1 in a circuit in which an electric current flows to the first inductor L1 when the switching element Q1 is turned on. Further, the constant current element Q2 configures a circuit such that the constant current element Q2 is also interposed in a driving circuit for the first switching element Q1 including the second inductor DW that drives the switching element Q1.

In this embodiment, the diode D1 can operate in the frequency domain equal to or higher than megahertz order. The diode D1 provides a circuit used when a decreasing electric current (a regenerative current) flows out from the first inductor L1 of the switching power supply SR explained below. It is possible to easily satisfy the frequency condition by using the wide bandgap semiconductor, for example, a GaN diode. The diode D1 performs a satisfactory operation even in the frequency domain equal to or higher than 10 MHz. Therefore, faster switching can be performed. The diode D1 only has to be a diode that can feed the decreasing electric current in a forward direction from the first inductor L1.

As explained above, the series-connected body SCB can operate in the frequency domain equal to or higher than megahertz order and preferably can perform a satisfactory operation even in the frequency domain equal to or higher than 10 MHz. The elements of the series-connected body SCB include a wide bandgap semiconductor having a bandgap wider than the bandgap of gallium arsenide (GaAs).

In the series-connected body SCB of the integrated switching power supply device 100 according to this embodiment, as shown in FIG. 1, the switching element Q1, the constant current element Q2, and the diode D1 are connected in series in this order in polarities shown in the figure. The first external terminal t1 is connected to one main terminal (a drain) of the switching element Q1. The second external terminal t2 is connected to the other main terminal (an anode) of the diode D1. The third external terminal t3 is connected to a connection point of the other main terminal (a source) of the constant current element Q2 and one main terminal (a cathode) of the diode D1. The fourth external terminal t4 is connected to the control terminal (the gate) of the switching element Q1. The fifth external terminal t5 is configured to supply electric power to the driving control element 101 and connected to the driving control element 101. The sixth external terminal t6 is configured to input reference potential to the driving control element 101 and connected to the driving control element 101. The seventh external terminal t7 is configured to input a signal to the driving control element 101 from the outside and connected to the driving control element 101. In this way, the integrated switching power supply device 100 according to this embodiment includes the seven external terminals.

As shown in FIGS. 2A and 2B, the integrated switching power supply device 100 is configured by, for example, a GaN multi-chip structure. The integrated switching power supply device 100 is flip-chip mounted. If desired, the switching element Q1, the constant current element Q2, and the diode D1 may be continuously formed as a GaN single chip to be connected in series.

If the integrated switching power supply device 100 is configured by the GaN multi-chip structure, as shown in FIG. 2B, the integrated switching power supply device 100 is configured as, for example, a laminated body including a metal substrate M, an insulating layer I, a GaN chip GC, a resist layer R, and solder bumps BU. In the GaN chip GC, relatively large square portions indicated by dotted lines in FIG. 2A are respectively chips of the switching element Q1, the constant current element Q2, and the diode D1. The switching element Q1, the constant current element Q2, and the diode D1 are integrated and connected in series to form the GaN chip GC. Relatively small square portions indicated by solid lines in the figure are bump openings formed in the resist layer R. Electrodes E forming external terminals of the switching element Q1, the constant current element Q2, the diode D1, and the driving control element 101, to which the plurality of external terminals t1 to t7 are connected, are exposed in the bump openings. Relatively small square portions indicated by dotted lines are terminal portions same as above to which the external terminals are not connected. The three solder bumps BU shown in FIG. 2B respectively form the first external terminal t1, the second external terminal t2, and the third external terminal t3. The outer periphery of the integrated switching power supply device 100 excluding the solder bumps BU can be surrounded by a known package (not shown in the figures).

The integrated switching power supply device 100 can also be configured by forming the first switching element Q1 and the constant current element Q2, which are connected in series, as one chip, independently forming the diode D1 as one chip, and integrating the elements formed as the multiple chips. The chip formed by the switching element Q1 and the constant current element Q2 and the chip formed by the diode D1 can be respectively formed as common circuit components. Therefore, it is possible to cope with various circuit forms.

According to this embodiment, since the integrated switching power supply device 100 includes the configuration explained above, if an increasing electric current flowing through the constant current element Q2 reaches the constant current value and is about to further increase, the voltage at both ends of the constant current element Q2 suddenly rises. The potential of the other main terminal (a source) incorporated in the driving circuit for the switching element Q1 can be set relatively high with respect to the potential of the control terminal (the gate) according to the voltage rise at both the ends that occurs in the constant current element Q2. As a result, since the potential of the control terminal is lower than a threshold voltage of the switching element Q1, the switching element Q1 can be turned off. Since the switching element Q1 is the normally-on switch and the threshold voltage is negative, this circuit operation is more easily and surely performed. However, the circuit operation is effective for the normally-off switch as well.

The switching power supply SR including the integrated switching power supply device 100 according to this embodiment includes the direct-current power supply DC and a chopper circuit CHC as shown in FIG. 1. Input terminals t11 and t12 are connected to an alternating-current power supply AC via a rectifying circuit Rec. The load circuit LC is connected to output terminals t13 and t14.

In this embodiment, the chopper circuit CHC is a concept including various choppers such as a falling voltage chopper, a rising voltage chopper, and rising-falling voltage chopper. Further, the chopper circuit CHC includes a chopper circuit in the case of a synchronous rectification system. All the choppers include the integrated switching power supply device 100 and the first inductor L1 as main components. The chopper circuit CHC turns on the switching element Q1, whereby an increasing electric current flows from the direct-current power supply DC to the first inductor L1. The chopper circuit CHC turns off the switching element Q1, whereby electromagnetic energy accumulated in the first inductor L1 is discharged and a decreasing electric current flows through the diode D1. The chopper circuit CHC repeats this operation. The choppers are common in DC-DC converting the voltage of the direct-current power supply DC and outputting a direct-current voltage to an output end. In the case of the synchronous rectification system, in addition to the above, the chopper circuit CHC turns on a not-shown second switching element when the switching element Q1 is off and turns off the not-shown second switching element when the switching element Q1 is turned on.

In this embodiment, the chopper circuit CHC includes the second inductor DW magnetically coupled to the first inductor L1. The second inductor DW detects an increasing electric current flowing to the first inductor L1 when the switching element Q1 is turned on and maintains the switching element Q1 on with an output voltage of the first inductor L1. Specifically, the second inductor DW supplies, to the control terminal (the gate) of the first switching element Q1, potential induced when the increasing electric current flows to the first inductor L1 and maintains the switching element Q1 on.

Further, the chopper circuit CHC includes the input terminals t11 and t12 and the output terminals t13 and t14. The inside of the chopper circuit CHC is configured by any one of known various choppers such as the falling voltage chopper, the rising voltage chopper, and the rising-falling voltage chopper.

The direct-current power supply DC inputs a direct-current voltage before conversion to the chopper circuit CHC. The direct-current power supply DC may have any configuration as long as the direct-current voltage can be output. For example, the direct-current power supply DC can mainly include the rectifying circuit Rec. If desired, a smoothing circuit including a smoothing capacitor can be provided in the direct-current power supply DC. A secondary cell such as a battery can also be used. In a configuration shown as an example in FIG. 1, the rectifying circuit Rec preferably includes a bridge-type rectifying circuit and subjects an alternating-current voltage of an alternating-current power supply AC, for example, a commercial alternating-current power supply to full-wave rectification and outputs a direct-current voltage.

In the first embodiment, if desired, the switching power supply SR can be formed as a module to configure a switching power supply module. This module is suitable for the switching power supply SR that operates in the frequency domain equal to or higher than megahertz order, preferably, the frequency domain equal to or higher than 10 MHz. All external terminals provided in the switching power supply module are external terminals for a direct current and used only for inputting and outputting the direct current. Therefore, the operation of the switching power supply SR is stable and a marked reduction in the size of the switching power supply SR can be realized. Further, the switching power supply SR can also be provided adjacent to the load circuit LC, for example, a light-emitting diode of a luminaire. This contributes to a marked reduction in the size of the entire luminaire or the like. An inductor L including the first inductor L1 and the second inductor DW and the integrated switching power supply device 100 may be formed as a switching power supply module SMJ.

The integrated switching power supply device 100 according to the first embodiment is explained with reference to FIG. 3. The configuration of the integrated switching power supply device 100 is explained.

One main terminal (the drain) of the switching element Q1 is connected to the external terminal t1 of the integrated switching power supply device 100. The other main terminal (the source) of the switching element Q1 is connected to one main terminal (a drain) of the constant current element Q2. The control terminal (the gate) of the switching element Q1 is connected to the external terminal t4 of the integrated switching power supply device 100. The other main terminal (a source) of the constant current element Q2 is connected to one main terminal (a cathode) of the diode D1. A connection point of the source of the constant current element Q2 and the cathode of the diode D1 is connected to the external terminal t3 of the integrated switching power supply device 100. The other main terminal (the anode) of the diode D1 is connected to the external terminal t2 of the integrated switching power supply device 100. The control terminal (the gate) of the constant current element Q2 is connected to a driving circuit 101b of the driving control element 101. The driving circuit 101b is connected to an oscillation circuit 101a. The oscillation circuit 101a and the driving circuit 101b are connected to the external terminal t5 of the integrated switching power supply device 100. Electric power is supplied to the oscillation circuit 101a and the driving circuit 101b from the integrated switching power supply device 100. The oscillation circuit 101a and the driving circuit 101b are connected to the external terminal t6 of the integrated switching power supply device 100. Reference potential is input to the oscillation circuit 101a and the driving circuit 101b from the integrated switching power supply device 100. The external terminal t6 of the integrated switching power supply device 100 is connected to the connection point of the source of the constant current element Q2 and the cathode of the diode D1 as well. The external terminal t7 of the integrated switching power supply device 100 is connected to an external I/F (interface circuit) 101c of the driving control element 101. The external I/F 101c is connected to the oscillation circuit 101a and the driving circuit 101b of the driving control element 101.

The operation of the integrated switching power supply device 100 according to this embodiment is explained.

If the integrated switching power supply device 100 according to this embodiment is used as a self-excited chopper circuit in the chopper circuit CHC of the switching power supply SR, as explained above, when an electric current flowing to the switching element Q1 or the constant current element Q2 reaches a predetermined value, the driving control element 101 performs a driving control operation to turn off the constant current element Q2 and turns off the switching element Q1 using a voltage change between the main terminals (between the drain and the source) of the constant current element Q2.

If the integrated switching power supply device 100 according to this embodiment is used as a separately-excited chopper circuit in the chopper circuit CHC of the switching power supply SR, a signal is input to the external I/F 101c of the driving control element 101 from the external terminal t7 of the integrated switching power supply device 100 in order to control an operation state of the driving control element 101 from the outside. Examples of the signal input to the external I/F 101c include a dimming signal, a driving frequency control signal for the constant current element Q2, and a duty control signal for the constant current element Q2. The external I/F 101c inputs, on the basis of a signal input from the external terminal t7 of the integrated switching power supply device 100, an instruction signal to the oscillation circuit 101a and the driving circuit 101b connected to the external I/F 101c. The oscillation circuit 101a performs an oscillation operation on the basis of the instruction signal input from the external I/F 101c and inputs a signal based on the oscillation operation to the driving circuit 101b. The driving circuit 101b controls, on the basis of signals input from the oscillation circuit 101a and the external I/F 101c, a voltage applied to the control terminal (the gate) of the constant current element Q2. The oscillation circuit 101a and the driving circuit 101b are connected to the external terminal t5 of the integrated switching power supply device 100. Electric power is supplied to the oscillation circuit 101a and the driving circuit 101b from the integrated switching power supply device 100. The oscillation circuit 101a and the driving circuit 101b are connected to the external terminal t6 of the integrated switching power supply device 100 connected to the connection point of the source of the constant current element Q2 and the cathode of the diode D1. Reference potential is input to the oscillation circuit 101a and the driving circuit 101b from the integrated switching power supply device 100.

Effects of the integrated switching power supply device 100 according to this embodiment are explained.

In the integrated switching power supply device 100 according to this embodiment, the series-connected body SCB in which the switching element Q1, the constant current element Q2, and the diode D1 are connected in series and the driving control element 101 connected to the control terminal of the constant current element Q2 and configured to control to drive the constant current element Q2 are integrated. Therefore, since the length of pattern wiring for connecting the elements is reduced, it is possible to perform switching at a high frequency equal to or higher than megahertz order and reduce the size of the integrated switching power supply device 101 and the electric apparatus.

A modification of the integrated switching power supply device 100 according to this embodiment is explained.

In the integrated switching power supply device 100, the series-connected body SCB and the driving control element 101 may be formed as one chip. Alternatively, the integrated switching power supply device 100 may be configured by independently forming each of the series-connected body SCB and the driving control element 101 as one chip and integrating the elements formed as multiple chips.

Further, the integrated switching power supply device 100 can be formed by forming the constant current element Q2 and the driving control element 101 as one chip of an element 102, forming the switching element Q1 and the diode D1 as one chip of an element 103, and integrating the chips formed independently from each other.

The integrated switching power supply device 100 is configured by forming the element 102 and the element 103 as the chips independently from each other and integrating the two chips of the element 102 and the element 103. Therefore, a commercially available control driving IC having a withstanding voltage corresponding to the gate-to-source voltage of the switching element Q1 can be used as the element 102.

In the integrated witching power supply device 100, the switching element Q1 and the diode D1, which need to have a withstanding voltage corresponding to an input voltage and an output voltage of the switching power supply SR, are formed as one chip of the element 103. The commercially available control driving IC having the withstanding voltage corresponding to the gate-to-source voltage of the switching element Q1 is used as the element 102. The element 102 and the element 103 are formed as a module. Therefore, it is possible to reduce costs of the integrated switching power supply device 100 and the electric apparatus.

Second Embodiment

Figure 4:
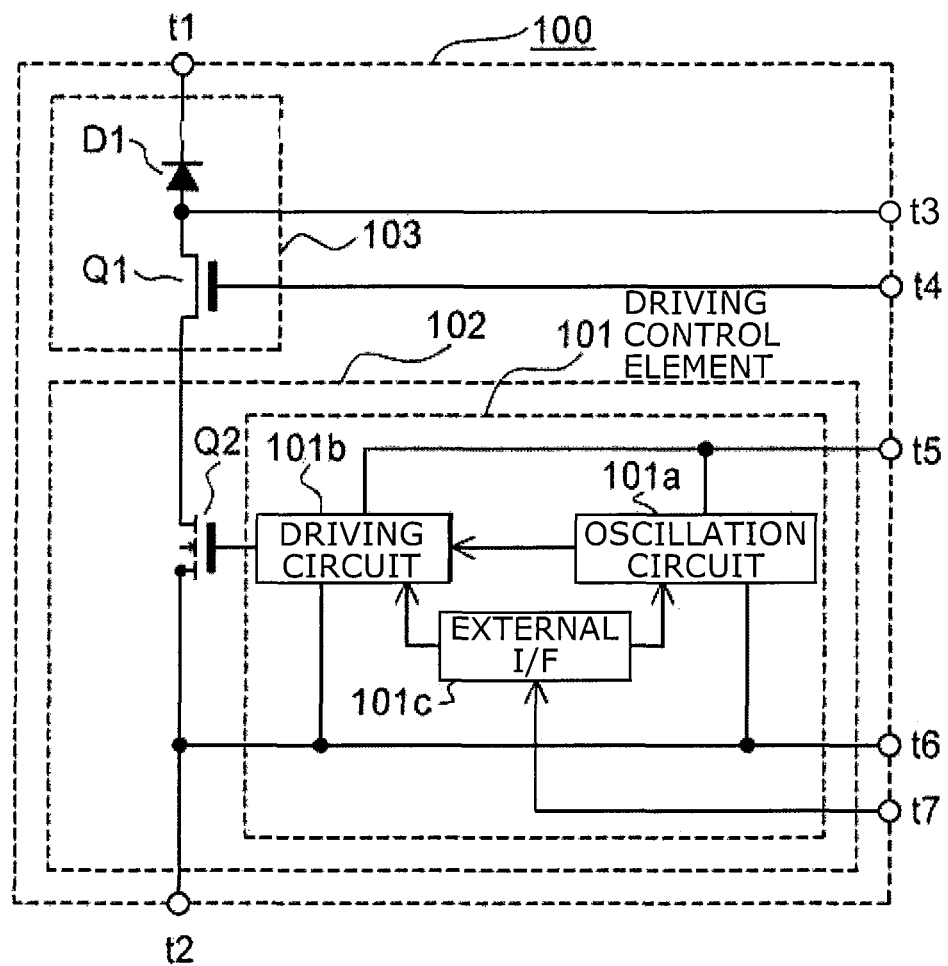
FIG. 4 is a circuit diagram of an integrated switching power supply device according to a second embodiment.

The integrated switching power supply device 100 according to a second embodiment is explained with reference to FIG. 4. The configuration of the integrated switching power supply device 100 according to this embodiment is explained.

One terminal (the cathode) of the diode D1 is connected to the external terminal t1 of the integrated switching power supply device 100. One main terminal (the drain) of the switching element Q1 is connected to the other main terminal (the anode) of the diode D1. The external terminal t3 of the integrated switching power supply device 100 is connected to a connection point of the external terminal t1 of the integrated switching power supply device 100 and the cathode of the diode D1. The other main terminal (the source) of the switching element Q1 is connected to one main terminal (the drain) of the constant current element Q2. The control terminal (the gate) of the switching element Q1 is connected to the external terminal t4 of the integrated switching power supply device 100. The other main terminal (the source) of the constant current element Q2 is connected to the external terminal t2 of the integrated switching power supply device 100. The control terminal (the gate) of the constant current element Q2 is connected to the driving circuit 101b of the driving control element 101. The driving circuit 101b is connected to the oscillation circuit 101a. The oscillation circuit 101a and the driving circuit 101b are connected to the external terminal t5 of the integrated switching power supply device 100. Electric power is supplied to the oscillation circuit 101a and the driving circuit 101b from the integrated switching power supply device 100. The oscillation circuit 101a and the driving circuit 101b are connected to the external terminal t6 of the integrated switching power supply device 100. Reference potential is input to the oscillation circuit 101a and the driving circuit 101b form the integrated switching power supply device 100. The external terminal t6 of the integrated switching power supply device 100 is connected to the connection point of the source of the constant current element Q2 and the cathode of the diode D1 as well. The external terminal t7 of the integrated switching power supply device 100 is connected to the external I/F 101c of the driving control element 101. The external I/F 101c is connected to the oscillation circuit 101a and the driving circuit 101b of the driving control element 101.

The integrated switching power supply device 100 according to this embodiment has action and effects same as the action and the effects in the first embodiment. A modification same as the modification of the first embodiment can be applied to the integrated switching power supply device 100.

In this embodiment, in the series-connected body SCB, one main terminal (the drain) of the switching element Q1 is connected to one main terminal (the anode) of the diode D1. Therefore, it is possible to form the switching element Q1 and the diode D1 as one chip of the element 103 more easily than in the first embodiment. It is possible to reduce costs of the element 103. Further, if the commercially available control driving IC having the withstanding voltage corresponding to the gate-to-source voltage of the switching element Q1 is used as the element 102 and the element 102 and the element 103 are formed as a module, it is possible to further reduce costs of the integrated switching power supply device 100 and the electric apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. An integrated switching power supply device comprising:
   a series-connected body in which a switching element, a constant current element, and a diode are connected in series;
   a driving control element connected to a control terminal of the constant current element and configured to control to drive the constant current element; and
   a plurality of external terminals including a first external terminal connected to a main terminal of an element located on one end side of the series-connected body, a second external terminal connected to a main terminal of an element located on one other end side of the series-connected body, a third external terminal connected to a connection point of a main terminal of the switching element or the constant current element and a main terminal of the diode, a fourth external terminal connected to a control terminal of the switching element, a fifth external terminal connected to the driving control element and connected to a power supply source for the driving control element, a sixth external terminal connected to the driving control element and configured to input reference potential to the driving control element, and a seventh external terminal connected to the driving control element and configured to input a signal to the driving control element from an outside.

2. The device according to claim 1, wherein the constant current element and the driving control element are integrated and formed as a module.

3. The device according to claim 2, wherein the switching element and the diode are integrated.

4. The device according to claim 1, wherein the third external terminal and the sixth external terminal are used in common.

5. The device according to claim 1, further comprising:
   an interface circuit to which a signal is input from the outside;
   an oscillation circuit configured to perform oscillation or stop oscillation on the basis of the signal input to the interface circuit; and
   a driving circuit configured to control, on the basis of signals of the oscillation circuit and the interface circuit, a voltage applied to the control terminal of the constant current element.

6. The device according to claim 5, wherein the driving control element causes, on the basis of the signal input to the interface circuit, via the constant current element, the switching element to oscillate in a separately-excited manner or oscillate in a self-excited manner.

7. The device according to claim 1, wherein the switching element has a normally-on characteristic.

8. The device according to claim 1, wherein the switching element is a GaN-HEMT.

9. The device according to claim 1, wherein the elements of the series-connected body include a wide bandgap semiconductor having a bandgap larger than a bandgap of gallium arsenide (GaAs).

10. The device according to claim 1, wherein the elements of the series-connected body are connected in series in order of the switching element, the constant current element, and the diode.

11. The device according to claim 1, wherein
the switching element and the constant current element are GaN-HEMTs,
the first external terminal is connected to a drain of the switching element,
the second external terminal is connected to an anode of the diode,
the third external terminal is connected to a source of the constant current element and a cathode of the diode, and
the fourth external terminal is connected to a gate of the switching element.

12. The device according to claim 1, wherein the elements of the series-connected body are flip-chip mounted on an insulating layer.

13. The device according to claim 1, wherein the plurality of external terminals are solder bumps.

14. The device according to claim 1, further comprising a first inductor to which an electric current flows via the switching element or the diode.

15. The device according to claim 14, wherein the series-connected body and the first inductor configure a chopper circuit.

16. The device according to claim 14, further comprising a second inductor magnetically coupled to the first inductor.

17. The device according to claim 16, wherein the second inductor is connected to the control terminal of the switching element.

18. The device according to claim 1, wherein the elements of the series-connected body are connected in series in order of the diode, the constant current element, and the switching element.

19. The device according to claim 18, wherein
the switching element and the constant current element are GaN-HEMTs,
the first external terminal is connected to a cathode of the diode,
the second external terminal is connected to a source of the constant current element,
the third external terminal is connected to a drain of the switching element and an anode of the diode, and
the fourth external terminal is connected to a gate of the switching element.

20. An electric apparatus comprising:
an integrated switching power supply device; and
a load circuit connected to the integrated switching power supply device,
the integrated switching power supply device including:
a series-connected body in which a switching element, a constant current element, and a diode are connected in series;
a driving control element connected to a control terminal of the constant current element and configured to control to drive the constant current element; and
a plurality of external terminals including a first external terminal connected to a main terminal of an element located on one end side of the series-connected body, a second external terminal connected to a main terminal of an element located on one other end side of the series-connected body, a third external terminal connected to a connection point of a main terminal of the switching element or the constant current element and a main terminal of the diode, a fourth external terminal connected to a control terminal of the switching element, a fifth external terminal connected to the driving control element and connected to a power supply source for the driving control element, a sixth external terminal connected to the driving control element and configured to input reference potential to the driving control element, and a seventh external terminal connected to the driving control element and configured to input a signal to the driving control element from an outside.

* * * * *